E. LONG.
LOCK.
APPLICATION FILED APR. 5, 1921.

1,411,111. Patented Mar. 28, 1922.
3 SHEETS—SHEET 1.

Edward Long,
INVENTOR

BY Victor J. Evans
ATTORNEY

WITNESS:

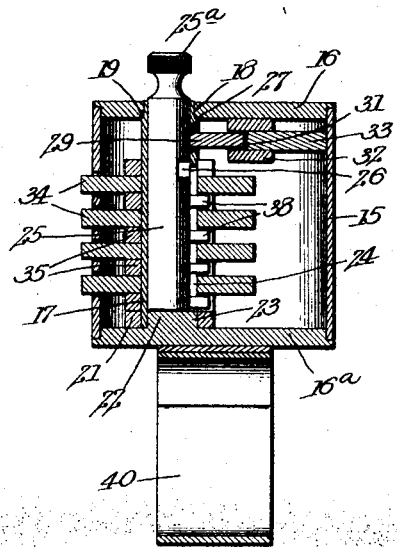
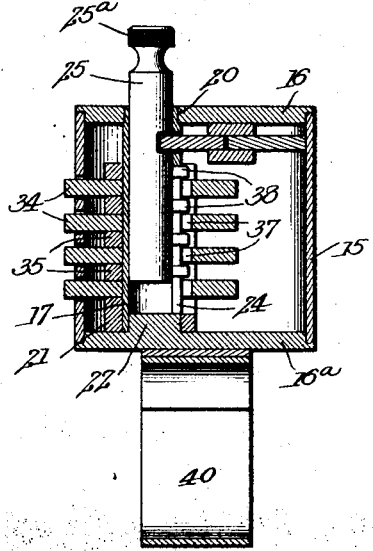
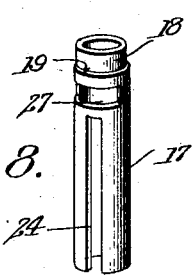
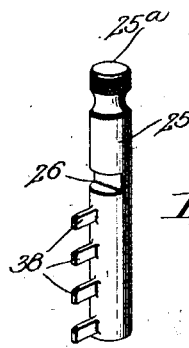
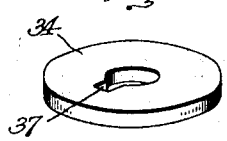

UNITED STATES PATENT OFFICE.

EDWARD LONG, OF BURKE, IDAHO.

LOCK.

1,411,111.   Specification of Letters Patent.   Patented Mar. 28, 1922.

Application filed April 5, 1921. Serial No. 458,783.

*To all whom it may concern:*

Be it known that I, EDWARD LONG, a citizen of the United States, residing at Burke, in the county of Shoshone and State of Idaho, have invented new and useful Improvements in Locks, of which the following is a specification.

This invention relates to combination locks and has for an object the provision of a lock of this type in which a chain carried pin may be locked within a stationary casing so as to adapt the lock for use in connection with motorcycles and the like.

Another object of the invention is the provision of novel means for locking the pin within the casing, to securely hold the same against unauthorized removal, means being provided for readily releasing the pin by a person familiar with the operation of the lock.

Another object is the provision of novel means for supporting and holding the lock mechanism within the casing to facilitate the ready assembling of the various parts of the lock mechanism in manufacture and to permit the lock to be easily taken apart and reassembled if necessary.

With the above and other objects in view, the invention further includes the following novel features and details of construction, to be hereinafter more fully described, illustrated in the accompanying drawings and pointed out in the appended claims.

In the drawings:—

Figure 4 is a longitudinal section showing the lock in locked position.

Figure 5 is a similar view unlocked.

Figure 8 is a detail perspective view of the sleeve which receives the locking bolt and supports the tumblers or disks.

Figure 9 is a similar view of the locking bolt.

Figure 10 is a like view of one of the tumblers or disks.

Figure 1:
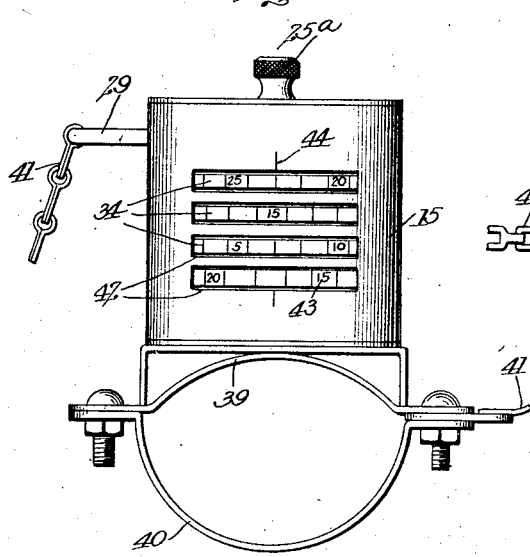
Figure 1 is an elevation of a lock embodying the present invention.
Figure 2:
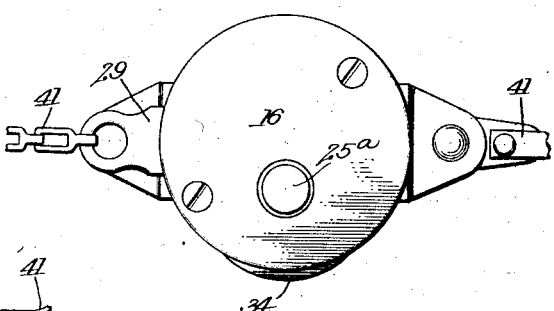
Figure 2 is an end view of the same.
Figure 3:
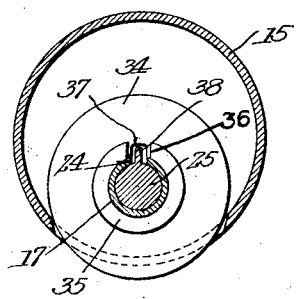
Figure 3 is a transverse sectional view taken on a line with one of the disks or tumblers.
Figure 6:
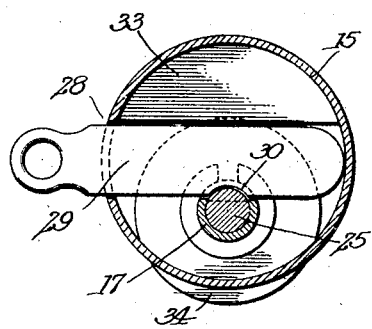
Figure 6 is a transverse section taken on a line with the removable pin and showing the latter in locked position.
Figure 7:
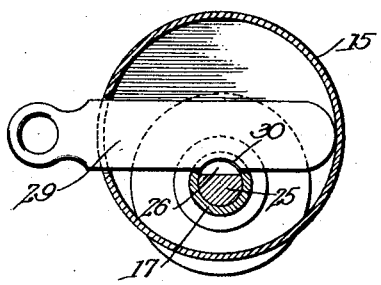
Figure 7 is a similar view unlocked.
Figure 11:
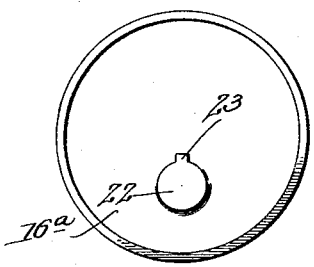
Figure 11 is an inner face view of one of the end plates of the casing showing the stud carried thereby.
Figure 12:
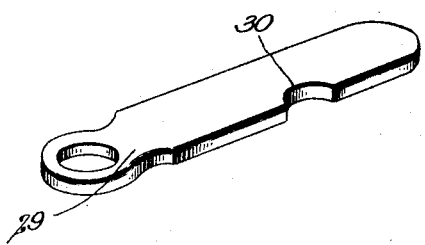
Figure 12 is a detail perspective view of the removable pin.

Referring in detail to the drawings, wherein like characters of reference denote corresponding parts, the reference character 15 indicates the lock casing, which casing is shown as of cylindrical formation and which includes end plates 16 and 16ª, the said plates being shouldered so as to fit snugly within and against the ends of the cylindrical portion of the casing.

Mounted within the casing is a sleeve 17, one end of which is reduced as shown at 18 to provide a shoulder 19. The reduced end of this sleeve fits within an opening 20 provided in the end plate 16, while the opposite end of the said sleeve has secured thereto an annulus 21. This annulus extends from the end of the sleeve and receives a stud 22 carried by the end plate 16ª, the said stud being provided with a key 23 which is receivable in one end of a slot 24 which extends longitudinally of the sleeve 17. The sleeve is thus securely supported within the casing in a manner to prevent either rotary or longitudinal movement.

Mounted for sliding movement within the sleeve 17 is a bolt 25, one end of this bolt extending beyond the end of the casing, where it is provided with a knurled operating knob 25ª. The bolt is further provided with a transversely arranged notch 26 which is adapted to be moved into and out of register with a slot 27 which is formed transversely in the sleeve 17. The casing of the lock is provided with a slot 28 which is located opposite the slot 27 of the sleeve 17, the said slots being adapted to accommodate a pin 29, which is removable upon the casing. This pin is formed with a notch 30 and when in locked position, this notch is arranged over the bolt 25 so that longitudinal movement of the pin is prevented. In order to prevent movement of the pin in any other direction, the said pin operates within a guide groove 31 which is formed by spaced plates 32 arranged transversely of the casing, the plates being connected by a segment 33 which forms a bottom for the groove and aids in holding the plates in position.

Rotatably mounted upon the sleeve 17 are disks or tumblers 34, which are spaced apart by rings 35, the said rings being secured to the sleeve. The rings 35 are split and have their ends spaced apart to provide slots 36 which are in register with the slot 24 of the sleeve 17. The disks or tumblers 34 are provided with notches 37, which are adapted to be brought into and out of register with the slot 24.

Extending from the bolt 25 are spaced fingers 38, the said fingers extending through the slot 24 and being movable through the slots 36 of the spacing rings 35. These fingers are so proportioned as to permit them to be positioned between the disks or tumblers 34 so that the latter may be rotated to move their notches 37 out of alignment with the slots 24 and 36. In this position, the notch 26 will be out of register with the slot 27 and the pin 29 held against removal from the casing, while by rotating the disks or tumblers 34 to align the notches 37 with the slots 24 and 36, the fingers may be moved into or through the notches 37 by the outward movement of the bolt 25. The notch 26 and slot 27 may thus be brought into register and the pin withdrawn.

The lock is especially adapted for use upon motorcycles or bicycles and for the purpose of securing the lock in position, there is provided a clamp which includes members 39 and 40, the former being permanently secured to the end plates 16a, while the latter is removably secured to the former through the medium of bolts of similar fastening devices as shown. By this means the lock may be secured upon a suitable portion of the frame of the motorcycle or bicycle and when once secured in position, the bolts may be upset to prevent the removal of the nuts. A chain 41 has one end secured to the clamp and its other end secured to an eye provided in the pin 29 and this chain may be engaged around the rim of the wheel or other suitable part of the motorcycle and when the pin 29 is locked in position, unauthorized use of the motorcycle will be prevented.

In order to determine the position of the notches 37 of the disks or tumblers 34, the said disks extend through slots 42 formed in the lock casing and have their peripheries provided with numbers or other characters 43. Certain of these numbers or characters are adapted to be brought into register with an indicating mark 44 provided by the lock casing as will be readily understood. The numbers or characters upon the disks or tumblers 34 may be so arranged with respect to the notches 37 as to provide different combinations of numbers for the operation of different locks.

The invention is susceptible of various changes in its form, proportions and minor details of construction and the right is herein reserved to make such changes as properly fall within the scope of the appended claims.

Having described the invention what is claimed is:—

1. A lock comprising a casing, a longitudinally slotted bearing sleeve supported in each end of the casing, means for holding the sleeve against movement, a bolt slidable in said sleeve and extending without the casing, a pin slidable transversely of the casing, said pin entering a slot arranged transversely of the sleeve and provided with a notch for engagement with the periphery of the bolt to hold the latter against movement, a notch formed transversely of the bolt and capable of being moved into and out of register with the transverse slot of the sleeve and means mounted upon the sleeve and extending through the casing, whereby the bolt may be held against movement to hold the pin in position, or released to permit of the withdrawal of the pin.

2. A lock comprising a casing, a longitudinally slotted bearing sleeve, means for supporting one end of the sleeve within an opening in one end of the casing, a stud extending from the opposite end of the casing for entrance within the sleeve, a key extending from the stud and engaging the longitudinal slot in said sleeve to support and hold the latter against rotation, a bolt slidable in said sleeve and extending without the casing, a pin slidable transversely of the casing, said pin entering a slot arranged transversely of the sleeve and being provided with a notch for engagement with the periphery of the bolt to hold the latter against movement, a notch formed transversely of the bolt and capable of being moved into and out of register with the transverse slot of the sleeve and means mounted upon the sleeve and extending through the casing, whereby the bolt may be held against movement to hold the pin in position, or released to permit of the withdrawal of the pin.

3. A lock comprising a casing, a longitudinally slotted bearing sleeve supported in each end of the casing, means for holding the sleeve against rotation, a bolt slidable in said sleeve and extending without the casing, a pin slidable transversely of the casing, spaced plates arranged transversely of the casing and connected together to provide a guiding groove for the pin, said pin entering a slot arranged transversely of the sleeve and being provided with a notch for engagement with the periphery of the bolt to hold the latter against movement, a notch formed transversely of the bolt and capable of being moved into and out of register with the transverse slot of the sleeve and means mounted upon the sleeve and extending through the casing, whereby the bolt may be held against movement to hold the pin in position or released to permit of the withdrawal of the pin.

In testimony whereof I affix my signature.

EDWARD LONG.